United States Patent [19]

Pointeau

[11] Patent Number: 4,772,120
[45] Date of Patent: Sep. 20, 1988

[54] DETERMINATION OF THE TRANSFER FUNCTION OF AN OPTICAL INSTRUMENT

[75] Inventor: François Pointeau, Antony, France

[73] Assignee: Matra, France

[21] Appl. No.: 883,941

[22] Filed: Jul. 10, 1986

[30] Foreign Application Priority Data

Jul. 10, 1985 [FR] France .................. 85 10580

[51] Int. Cl.$^4$ ............................. G01M 11/00
[52] U.S. Cl. ............................... 356/124.5
[58] Field of Search .................... 356/124, 124.5

[56] References Cited

FOREIGN PATENT DOCUMENTS

| | | | |
|---|---|---|---|
| 1527595 | 10/1978 | United Kingdom | 356/124.5 |
| 1601642 | 11/1981 | United Kingdom | 356/124.5 |
| 1080054 | 3/1984 | U.S.S.R. | 356/124.5 |

OTHER PUBLICATIONS

Progress in Optics, vol. 5, 1966, "Instruments for the Measuring of Optical Transfer Functions" Morato.
Conference: Image Assessment and Specification, Rochester, N.Y. (20-22) May 1974, "Trends in the Development of OTF Measuring" Rosenburch.

*Primary Examiner*—F. L. Evans
*Attorney, Agent, or Firm*—Larson and Taylor

[57] ABSTRACT

For measuring the optical transfer function of an optical instrument having an input pupil, a device comprises a source of spatially coherent light for illuminating the pupil of the instrument. Two separate zones are isolated in the input pupil of the instrument by a system comprising a grating, a lens for forming an image and a spatial filter which eliminates the zero diffraction order. The two zones have a spacing which is in direct relation to the spatial frequency. The position and mutual spacing of the fringes are determined. A computer derives the transfer function from the measurements made for a plurality of pairs of zones.

11 Claims, 1 Drawing Sheet

DETERMINATION OF THE TRANSFER FUNCTION OF AN OPTICAL INSTRUMENT

BACKGROUND OF THE INVENTION

The invention relates to the determination of the quality of an optical instrument and particularly the measurement of its optical transfer function or OTF.

The quality of an optical system is typically represented either by the value of its optical transfer function OTF (in polychromatic light when the instrument is not for operating on a particular wavelength) or by the aberrant deviation $\Delta(x,y)$ for each of the points of the pupil as defined by its Cartesian coordinates x and y.

When designing a new optical instrument, the transfer function resulting from its optical formula is computed. It is however necessary to measure if the optical quality of the actual instrument corresponds to the design calculation based on modelization. Numerous methods are already known for determining the optical quality of an existing instrument. All have drawbacks, namely limitations in use which make them inapplicable in numerous cases.

Interferometry methods are known. Reference may be made in that respect to "OTF measurements with a white light source: an interferometric technique" in Applied Optics, Vol. 14, No. 7, July 75, pp. 1613-1615, or "Progress in Optics", Vol. 5, No. 5, 1966, pp. 204-209 and 234-237. They are difficult to put into practice in polychromatic light. Methods are also known for the direct measurement of the MTF, particularly that used in the apparatus sold by the assignees of the present invention, under the tradename "ACOFAM". This apparatus gives satisfactory results for instruments having current dimensions, but it requires a generator and an analyzer whose dimensions are comparable to those of the respective beams. In practice, that means that an instrument of very large or very small size would require a very specific object generator since this generator must be sized to the dimensions of the object field.

Finally Cotton and Hartmann methods are known for measuring the value of the aberrant deviation. For that, a differential method is used consisting in disposing in the pupil of the instrument to be studied a diaphragm pierced with two openings. The Cotton assembly is the one shown schematically in FIG. 1. A pinpoint source 10, monochromatic or at least having a narrow spectrum, illuminates a diaphragm 12 placed in the pupil of the instrument 14 to be studied. The mutually coherent secondary sources formed by the two openings 16 of diaphragm 12 create in the image plane 18 a system of interference fringes. The measurement of the position of the center of the fringes gives an indication about the aberrant deviation difference between the points of the pupil corresponding to the openings of the diaphragm.

The measurement is repeated for several positions of the diaphragm along the directions x and y and gives, by a method of finite increments, a chart of the slopes of the wave surface. The assembly which has just been described appears as directly linked to the geometric optics, whereas the optical transfer function is linked to the diffraction, i.e. to undulatory optical phenomena. It is difficult and laborious to use the slopes of the wave surface to arrive at the optical transfer function, for an integration must be carried out which is all the less strict since using finite increments.

SUMMARY OF THE INVENTION

For supplying directly (not through the aberrant deviation), the optical transfer function of an instrument without it being necessary to use an object generator to the dimensions of the object field, the invention starts from the finding that it is possible to use, in conjunction, notions of geometric optics and undulatory optics and, in particular, to transpose the notions represented by the Duffieux integral to the determination of the transfer function from the variation of the complex amplitude $a(x,y)$ as a function of the coordinates x,y in the pupil, provided that a moderate aperture is kept, and the possibility of reforming the normalized transfer function NTF (defined in spatially incoherent illumination) from measurements made inherently from a spatially coherent source.

The invention provides consequently a method for measuring the optical quality of an instrument and more particularly its optical transfer function, in which two distinct zones are cut out in the input pupil of the instrument and the position of the fringes in the image delivered by the instrument is measured; the spacing between the two zones is given a value proportional to the spatial frequency for which the measurement is to be carried out, the spacing of the fringes is also measured and, from the separation and from the position of the fringes for several different pairs of two zones, the transfer function is derived by integration of the measurements for pairs of zones corresponding to the whole of the surface of the pupil. The whole of the pupil of the instrument is scanned by moving an optical element. The zones forming secondary sources may be generated by a grating.

When the transfer function is to be determined for an instrument intended for operating in polychromatic light it is sufficient to make measurements for several spatial frequencies while giving each time to the spacing between the two zones the corresponding value and to measure the transfer function by integration by also using as variable the wavelength as a variable parameter.

The invention also provides a device for implementing the above defined method, including a spatially coherent source, means intended to cut out two distinct zones in the input pupil of the instrument to be studied from the beam delivered by the source and means for analyzing the fringes formed in the image plane of the instrument placed behind said means, wherein said means give to the two zones a spacing in direct relation to the spatial working frequency and the device further includes calculation means for also determining the spacing of the fringes and for deriving from the separation and from the position of the fringes for several pairs of two distinct zones, the transfer function by integration of the measurements for pairs of zones corresponding to the whole of the surface of the pupil.

The invention will be better understood from reading the following description of a particular embodiment, given by way of non limitative example.

DETAILED DESCRIPTION OF PREFERRED EMBODIMENTS

Figure 1:
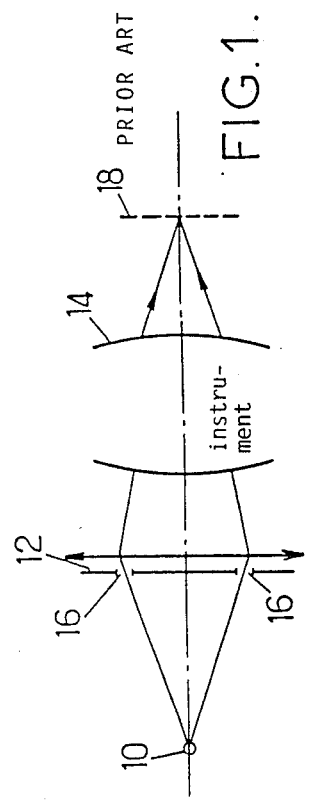
FIG. 1 already mentioned, is a diagram of the Cotton measuring system.
Figure 2:
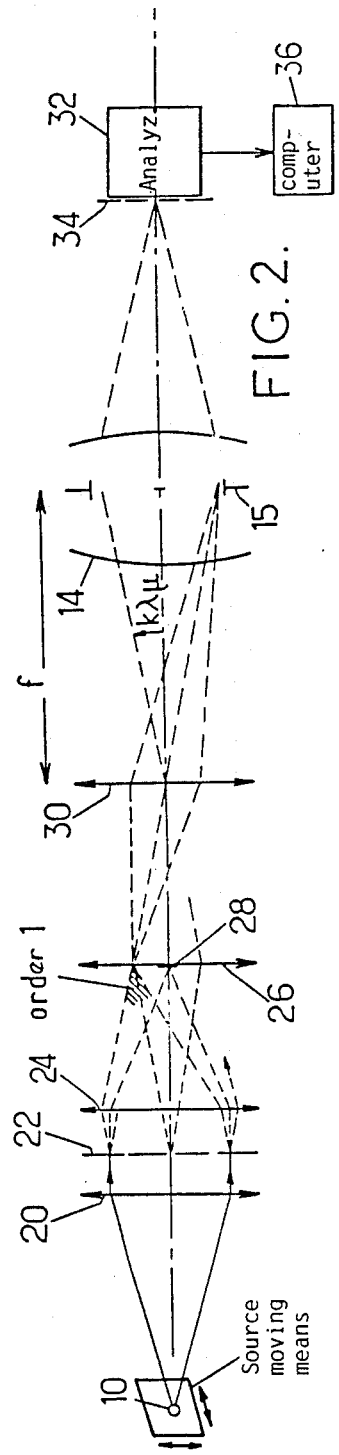
FIG. 2 is a diagram of a device for implementing the invention.

The device for implementing the invention whose optical diagram is given in FIG. 2 includes, like that of FIG. 1, a spatially coherent source 10, which means in practice that it is quasi pin-point. The output beam from the source is transformed into a parallel beam by a condenser 20 and sent to a diffraction grating 22. This diffraction grating fixes the spatial frequencies $\mu$ and $\nu$ in the object space (inverse of the pitch in direction x and y). If the magnification of the whole of the system is equal to 1, which is a frequent case, it will be seen that the spatial frequencies $\mu$ and $\nu$ of the grating must be equal to half the spatial frequencies r and s for which the measurement is to be made, reduced to the space where the grating is located (object space). It can be seen that the spatial frequency may be modified, simply by acting on the optical system.

The output beam of the grating is taken up by a lens 24 which cooperates with a spatial filter 26 for eliminating the diffraction order 0. In practice, this spatial filter 26 will be formed by a lens placed in the plane of the Fourier spectrum of the grating having a central mask 28 cutting off the order 0. The higher orders are eliminated because of the limited aperture of the filter and the remaining orders other than $+1$ and $-1$ may be eliminated by calculation, as will be seen further on.

The image of the spectral plane is reformed by a field lens 30 in the input pupil 15 of the instrument to be tested 14. This field lens is not indispensable, but it improves the optical assembly.

It can be seen that the system thus formed approximates a double diffraction assembly.

Finally, the instrument to be studied reforms an image 34 in the plane of observation of an analyzer 32. If the instrument is such that no real image is formed, it will be followed by an auxiliary optical system and the transfer function which will be determined will use both the instrument and the auxiliary optical system.

The analyzer 32 may be of any well known type; it may be a motion picture camera, a CCD camera, a scanning apparatus, even a photographic apparatus, in the case of out-of-line use. The only requirement is that the analysis apparatus should allow the position of the fringes in the image plane and the modulation of these fringes (that is to say the difference between the white level and the black level) to be determined.

In such an apparatus, the transfer function may be derived from the measurements made by the analyzer 32 on the final image 34 of the network through the instrument 14 by means of the integral of Duffieux:

$$OTF(r,s) = \frac{\iint a\left(x + \frac{r\lambda f}{2}, y + \frac{s\lambda f}{2}\right) a^*\left(x - \frac{r\lambda f}{2}, y - \frac{s\lambda f}{2}\right) dx\, dy}{\iint |a(x,y)|^2\, dx\, dy} \quad (1)$$

In this formula:
$\lambda$ is the wavelength of light
f is the distance of pupil 15 of the instrument to the image of the network, taken up by the field lens,
$a(\lambda,x,y)$ is the distribution of amplitude on the pupil, which is only a function of x and y in monochromatic light.

To take into account the spectral distribution of the energy in the case of polychromatic light, a standardization of amplitude will be made so that we have, whatever the wavelength:

$$\iint |a(\lambda,x,y)|^2 dx\, dy = 1 \quad (2)$$

Each wavelength is weighted by a distribution, in the mathematical sense $W(\lambda)$, whose integral on the spectrum is limited.

Under these conditions, an optical transfer function OTF (r, s, $\lambda$) may be defined for each wavelength. The value of the polychromatic transfer function, for the whole of the working spectrum of the instrument, then is:

$$OTF(r,s) = \int W(\lambda) \cdot OTF(r,s,\lambda) d\lambda \quad (3)$$

Taking into account the above assumptions, the transposition of the Duffieux integral (1) leads to:

$$OTF(r,s) = \iiint W(\lambda) \cdot$$
$$a\left(\lambda, \frac{x + r\lambda f}{2}, \frac{s\lambda f}{2}\right) a^*\left(\lambda, x - \frac{r\lambda f}{2}, y - \frac{s\lambda f}{2}\right) \quad (4)$$

$$\ldots dx\, dy\, d\lambda$$

It will now be shown how the basic conception based on formula (4) may be applied in a device such as that shown in FIG. 2.

In this device the unit consisting of source 10, condenser 20, grating 22, lens 24 and spatial filter 26 forms a generator of pairs of mutually coherent secondary sources comparable to zones cut out in the plane of pupil 15. This generator delivers as many secondary source pairs (corresponding to the apertures in the assembly of FIG. 1) as there are wavelengths in the spectrum, and in each pair the sources are mutually coherent. The overall position of the pairs may be modified at will, by moving the generator and/or the field lens 30.

At this stage, it is necessary for explaining the invention to have recourse to theoretical considerations.

If a collimated beam of light of wavelength $\lambda$ is directed onto a grating whose spatial frequency is $\mu$ in direction x, $\nu$ in the orthogonal direction y, for a low aperture angle having components $\theta x$ in azimuth, $\theta y$ in elevation, diffraction peaks will be observed defined by angles $\theta'x$ and $\theta'y$:

$$\theta'x = \theta x + k\lambda\mu$$
$$\theta'y = \theta y + k\lambda\nu \quad (5)$$

where k is an integer.

The device shown in FIG. 2 allows the order 0 to be eliminated. Under these conditions, from the image of grating 22 peaks are obtained which (if the magnification of the image of the network is equal to 1) are directed along angular positions defined by angles $\theta''x$ and $\theta''y$:

$$\theta''x = \theta x + k\lambda\mu$$
$$\theta''y = \theta y + k\lambda\nu \quad (6)$$

where k is an integer different from 1.

The diffraction peaks will be projected, in the plane of pupil 15 on each side of the point where the image of the peak of order 0 would be formed. These peaks will be respectively offset by $(\mu\lambda f, \nu\lambda f)$ and $(-\mu\lambda f, -\nu\lambda f)$ for diffraction orders $+1$ and $-1$.

It is then sufficient to choose $\mu = r/2$ and $\mu = s/2$ so as to obtain, for each wavelength $\lambda$ to be studied, the appropriate pair of secondary sources. The whole of the pupil may be scanned by moving the primary source 10 or the field lens, for example by moving the source with a cross motion table, giving the coordinates of the source from which x and y are derived directly by calculation.

Measurements may also be made for a whole series of positions (x,y) of the center of the secondary sources in the plane of the pupil 15.

The analyzer 32 should be of a type allowing distances and light intensity to be measured and fringes to be counted. There already exist numerous analyzers fulfilling these functions. The analyzer is associated with computer means 36, advantageously programmed for performing a Fourier transform on the data obtained (FFT in general). Thus, from the measurements the mean intensity I is readily derived for the whole of the spectrum concerned:

$$I(x, y, \lambda, r, s) = \left| a\left(\lambda, x + \frac{r\lambda f}{2}, y + \frac{r\lambda f}{2}\right) \right|^2 + \left| a\left(\lambda, x - \frac{r\lambda f}{2}, y - \frac{s\lambda f}{2}\right) \right|^2 \quad (7)$$

and the sinusoidal variation law about the mean value:

$$I(x,y,\lambda,r,s).M(x,y,\lambda,r,s) \cos[\phi_G - \phi_D + 2\pi(rX + sY)] \quad (8)$$

In this last formula, X and Y are the coordinates in the image plane.

$\phi_D$ and $\phi_G$ are the respective arguments of $$a\left(\lambda, x + \frac{r\lambda f}{2}, y + \frac{s\lambda f}{2}\right) \text{ and } a\left(\lambda, x - \frac{r\lambda f}{2}, y - \frac{s\lambda f}{2}\right)$$

the modulation M itself being defined by the relationship $$I(x, y, \lambda, r, s) \cdot M(x, y, \lambda, r, s) = 2\left| a\left(\lambda, x + \frac{r\lambda f}{2}, y + \frac{s\lambda f}{2}\right) \right| \left| a\left(\lambda, x - \frac{r\lambda f}{2}, y - \frac{s\lambda f}{2}\right) \right| \quad (9)$$

Under these conditions, the illumination E(X,Y) in the image plane for the whole of the spectrum concerned will be written:

$$E(X, Y) = \int W(\lambda) \cdot I(x, y, \lambda, r, s) d\lambda + \int W(\lambda) \cdot I(x, y, \lambda, r, s) \cdot M(x, y, \lambda, r, s) \cos[\phi_G - \phi_D + 2\pi(rX + sY)] d\lambda \quad (10)$$

The first term of the second part of this formula represents the component which does not vary with X,Y and will be designated by B(x,y,r,s). We can then define m(x,y,r,s) and $\phi(x,y,r,s)$ by:

$$\int W(\lambda) \cdot I(x, y, \lambda, r, s) \cdot M(x, y, \lambda, r, s) \frac{\cos[\phi_G - \phi_D]}{\sin(\phi_G - \phi_D)} d\lambda = B(x, y, r, s) \cdot m(x, y, r, s) \frac{\cos\phi}{\sin\phi} \quad (11)$$

which will allow the lighting E (formula 10) to be written in the simplified form:

$$E(X,Y) = B(x,y,r,s)\{1 + m(x,y,r,s) \cos[2\pi(rX + sY) + \phi]\} \quad (12)$$

with, at the center $(X_o, Y_o)$ of the interference phenomenon:

$$\phi + 2\pi(rX_o + sY_o) = 0 \quad (13)$$

For each given spatial frequency to be tested (r,s) the set of values derived from the measurements of
B(x,y,r,s) component invariant with X and Y
m(x,y,r,s) modulation of the fringe system
$X_o$ and $Y_o$ giving access to $\phi = -2\pi[rX_o + sY_o]$ may be stored so as to form a data basis for calculating an optical quality parameter, and particularly the optical transfer function.

Calculation of the optical transfer function may be made by separating the modulus and the phase of the complex amplitude in the pupil so as to write:

$$OTF(r, s) = \int\int\int W(\lambda) \left| a\left(\lambda, x + \frac{r\lambda f}{2}, y + \frac{s\lambda f}{2}\right) \right| \left| a\left(\lambda, x - \frac{r\lambda f}{2}, y - \frac{s\lambda f}{2}\right) \right| \exp i(\phi_D - \phi_G) \, dx \, dy \, d\lambda \quad (14)$$

The analysis of the interference fringes, with a magnification equal to 1, causes the formula (9) to appear.

If we therefore calculate first of all the $\lambda$ integral of (14) by taking up again the notations of formula (9) we have $$\tfrac{1}{2}\int W(\lambda).I(x,y,\lambda,r,s)M(x,y,\lambda,r,s) \exp[i(\phi_D - \phi_G)]d\lambda$$

which is equal to:

$$\tfrac{1}{2}B(x,y,r,s).M(x,y,r,s) \exp(-i).$$

The analysis of the fringes (formula 13) has shown that $$\phi = -2\pi(rX_o + sY_o).$$

We may then rewrite the function in the form:

$$OTF(r,s) = \tfrac{1}{2}\int\int B(x,y,r,s)m(x,y,r,s) \exp[2\pi i(rX_o + sY_o)]dxdy$$

which may be calculated from digitized experimental data identified above.

Other determination than that of the optical transfer function may naturally be made, for example that of a quality factor.

The spatial filter formed by the lens 26 and mask 28 allowed the upper orders to be eliminated, but in some case the spectrum has an extent such that it is not possible to eliminate some upper orders for certain wavelengths, for they show overlapping with orders +1 and −1 for other wavelengths.

The detrimental upper orders may be eliminated by the analyzer, for example by electronic filtering of the image detected by a receiver. In fact, the frequencies given by these upper orders are different from the useful frequency. The elimination may also be made during the calculation itself.

Figure 3:
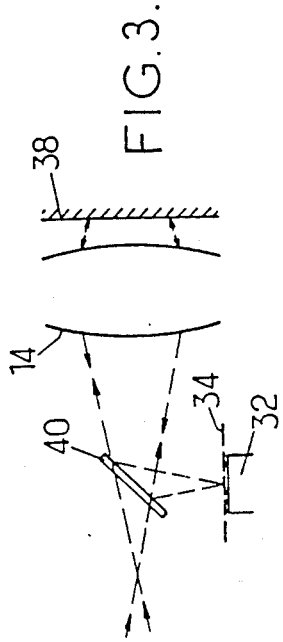
FIG. 3 is a partial view of a modified embodiment.

The invention is susceptible of numerous modifications. It may naturally be applied to the case of a monochromatic source which makes the use of a grating 22 pointless. This latter may then be replaced by a simple diaphragm with two apertures. A particularly useful variant in the case of an instrument whose dimensions make it difficult to measure the transfer function, because of the considerable size of the object generator which would be required, consists in forming a self-collimation assembly. FIG. 3 (where the elements corresponding to those already shown in FIG. 2 bear the same reference number) shows such an arrangement. A mirror 38 placed behind the instrument reflects back to this latter the light transmitted. A semi-transparent mirror 40 sends back a fraction of the intensity of the beam towards the analyzer 32. This assembly obviously doubles the aberrant deviations which will lead to dividing the measured values by two for $X_o$ and $Y_o$.

I claim:

1. A method of measuring the optical transfer function of an optical instrument, at a predetermined spatial frequency, comprising the steps of:
   (a) illuminating an input pupil of the instrument;
   (b) isolating a pair of two separate zones in said input pupil which have a mutual spacing in direct proportion to said spatial frequency;
   (c) measuring the distance and the position of fringes in an image provided by the instrument; and
   (d) deriving the value of said transfer function by integration of successive measurements of said distance and position for a plurality of successive pairs of zones selected to cover substantially the whole of the area of the input pupil.

2. A method as claimed in claim 1, wherein the position and distance of the fringes are measured for a plurality of different spatial frequencies, each measurement being made with said mutual spacing having a value corresponding to the associated spatial frequency and wherein said transfer function is measured by integration for a plurality of wavelengths.

3. A method as claimed in claim 1, further including the step of eliminating parasitic spatial frequencies during derivation.

4. A method as claimed in claim 1, further comprising reflecting light emerging from the optical instrument back into said optical instrument, wherein step (c) is carried out on the image provided by the optical instrument after it has been traversed twice by said light.

5. A method as claimed in claim 1, wherein steps (a) and (b) include directing spatially coherent light from a pinpoint source onto a diffraction grating, eliminating zero order and highest orders of diffraction and forming an image of the light spectrum generated by the grating in the input pupil of the instrument.

6. A device for measuring the optical transfer function of an optical instrument having an input pupil for a predetermined spatial frequency, comprising a source of spatially coherent light for illuminating said pupil; first means for isolating two separate zones in said input pupil of the instrument from the beam delivered by the source, said zones having a mutual spacing in direct relation to the spatial frequency; second means for analyzing fringes formed in the image plane of the instrument placed behind said first means and determining the position and spacing of the fringes; and computer means for deriving, from the spacing and from the position of the fringes for several pairs of two distinct zones, the transfer function by integration of the measurements for pairs of zones corresponding to substantially the whole of the surface of the input pupil.

7. A device as claimed in claim 6, wherein said first means comprise optical grating, means for forming an image and a spatial filter for suppressing the zero order of diffraction.

8. A device as claimed in claim 7, wherein said second means are provided for eliminating the higher diffration orders by frequency filtering.

9. A device as claimed in claim 7, further comprising means for moving the source in a plane which is orthogonal to an optical axis of the device and for measuring the amount of movements along two orthogonal coordinate directions.

10. A device as claimed in claim 6, wherein said second means are arranged for computing the Fourier transform of the measurements.

11. A device as claimed in claim 6, further comprising reflecting means for folding back the light coming from the instrument in a forward path, whereby the device operates as a self colimating unit, wherein the means for analyzing fringes are located to receive the light coming from the instrument on its return path.

* * * * *